April 26, 1949.
A. A. POWELL
2,468,107
FLUID DIFFERENTIAL
Filed May 3, 1946
2 Sheets-Sheet 1
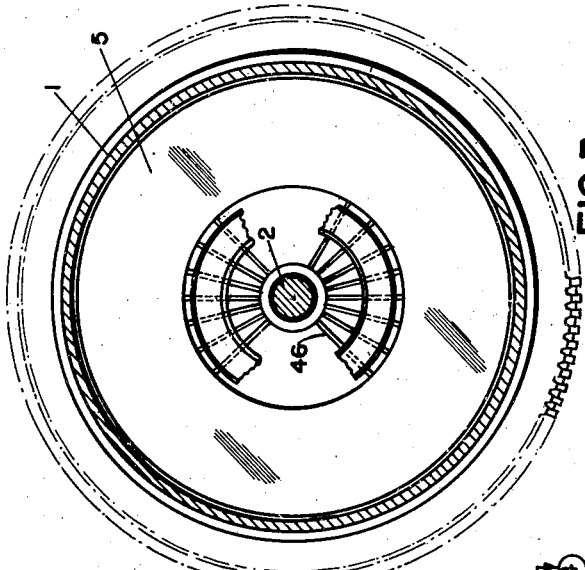
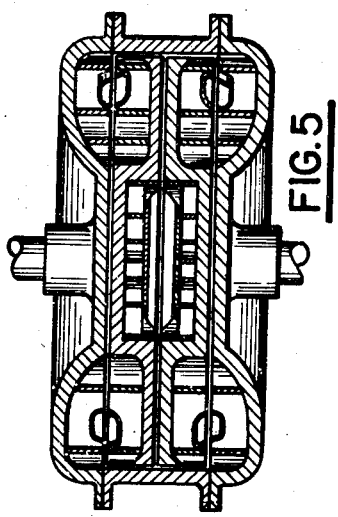
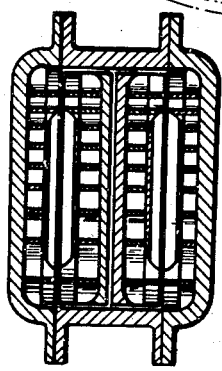
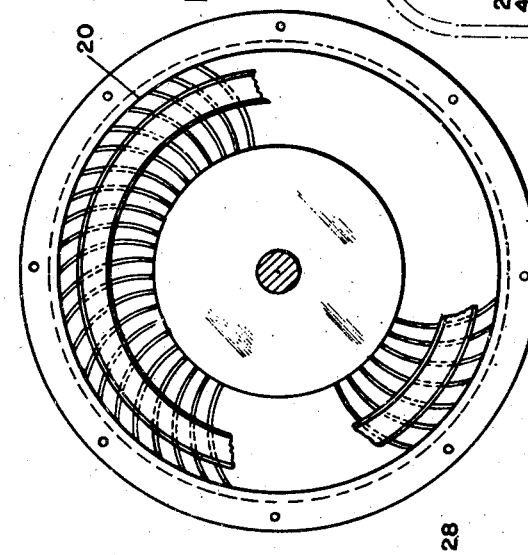
INVENTOR.
ALFRED A. POWELL
BY
Attorney

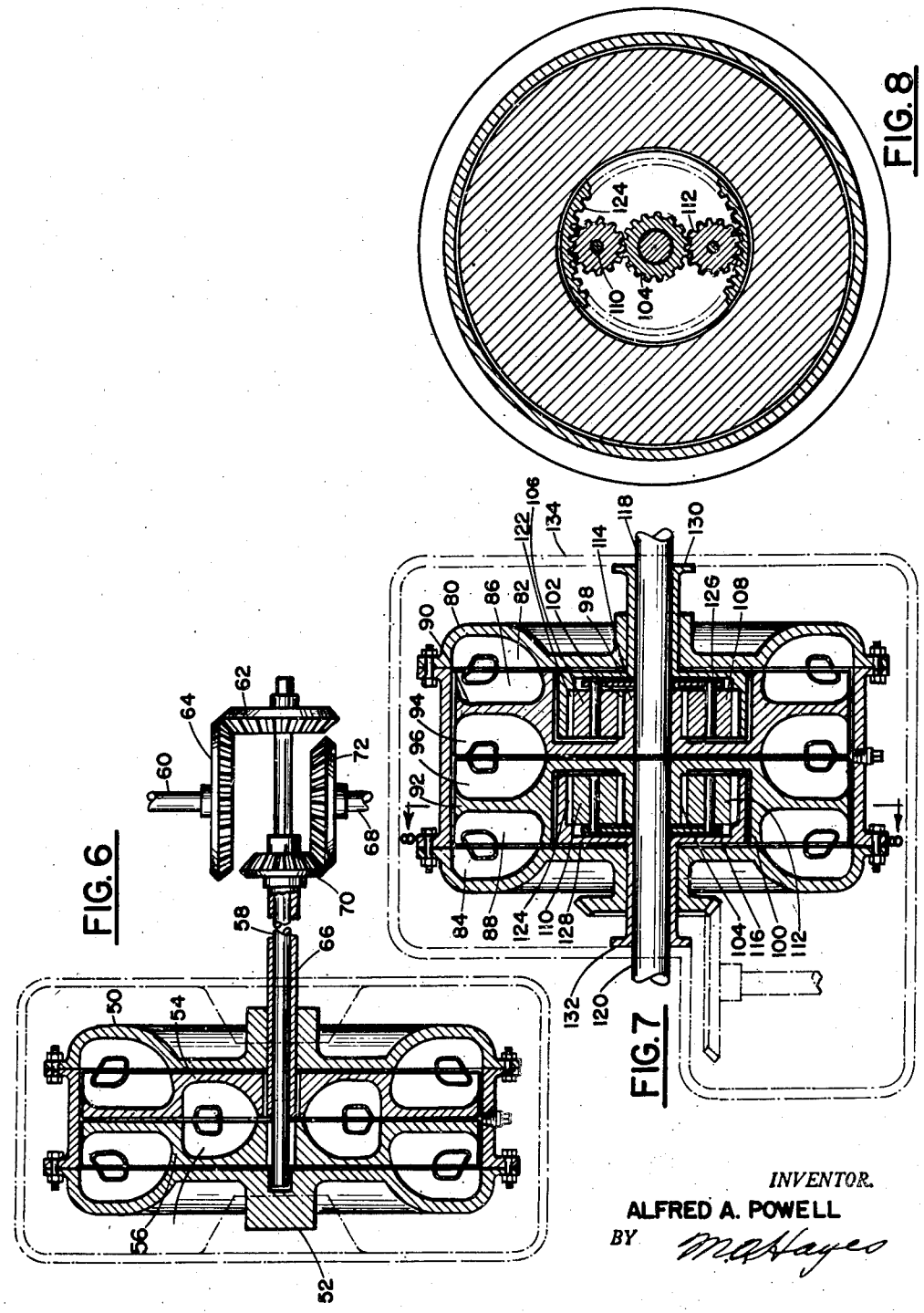

Patented Apr. 26, 1949

2,468,107

UNITED STATES PATENT OFFICE 2,468,107

FLUID DIFFERENTIAL

Alfred A. Powell, Fairfax, Va.

Application May 3, 1946, Serial No. 666,936

5 Claims. (Cl. 74—650)

(Granted under the act of March 3, 1883, as amended April 30, 1928; 370 O. G. 757)

This invention relates to fluid couplings which are adapted to transmit power from a single source to at least two driven shafts; in particular, it relates to a fluid coupling construction which is adapted to function as a differential in the power transmission of automotive equipment.

The adaptation of fluid drive mechanism for power transmission in automotive equipment has been made heretofore. In general such adaptation has consisted in substituting fluid couplings of various types for the conventional clutch mechanism in such equipment or in providing separate and independent fluid couplings for each driven wheel whereby the conventional differential gearing is eliminated. But this latter construction is cumbersome and heavier than the overall weight of the conventional differential gear construction.

Applicant's invention provides a single, unitary structure and mechanism which is adapted to transmit power from a prime mover to at least two shafts which may be the two half-axles of an automobile or other motive equipment.

It is, therefore, an object of this invention to provide a fluid coupling construction which will function as a differential in the transmission of power to the driven wheels of automotive equipment.

It is also an object of this invention to provide a fluid coupling which is adapted to function as a differential in which, in the event of no tractive effort being applied by one wheel, all of the power received by the fluid coupling is applied to the other wheel.

It is a further object of this invention to provide a fluid coupling which is adapted to function as a differential and which is provided with trains of planetary gears whereby the ratio of rotation of the driven shafts to the driving element is reduced for the purpose of transmitting heavy torque loads.

Other objects will be apparent from the following description, claims and from the accompanying drawings which are merely illustrative of preferred embodiments of applicant's invention and in which .

Figure 1 is a horizontal transverse section parallel to the driven shafts, through the simplest form of applicant's device. It is partly in section and partly in elevation.

Figure 2 is a vertical, transverse section at right angles to the driven shafts, taken along section line 2—2 of Figure 1. It is partly in section and partly in elevation.

Figure 3 is a vertical, transverse section at right angles to the driven shafts, taken along section line 3—3 of Figure 1. It is also partly in section and partly in elevation.

Figures 4 and 5 are vertical sections, parallel to the driven shafts, taken along section lines 4—4 and 5—5 of Figure 1 respectively. They are both partly in section and partly in elevation.

Figure 6 is a horizontal section through a modification of applicant's device which is adapted to transmit power to driven shafts which are parallel to the plane of the lateral faces of applicant's device. It is partly in section and partly in elevation.

Figure 7 is a horizontal section, parallel to the driven shafts, of another modification of applicant's device which is adapted for heavy duty service. It is partly in section and partly in elevation.

Figure 8 is a transverse vertical section taken along section line 8—8 of Figure 7. It is partly in section and partly in elevation.

Referring to Figure 1 which illustrates the simplest form of applicant's device 20 represents a rotary housing which is provided with hydraulic fluid and may be adapted to be driven by power applied through shaft 22, bevel gear 24 and ring gear 26. Housing 20 is provided with a series of vanes 27 and 28 which are positioned radially in the lateral faces of the housing toward the periphery thereof. These vanes are so shaped, i.e. curved, that as the housing is rotated at a sufficient rate the fluid contained between the vanes is driven outwardly and impinges on matching vanes 29 and 30 which are positioned on rotors 32 and 34 respectively. The circulation of the fluid between the vanes of the housing and the rotors is indicated by arrows 36 and 38 in Figure 1. Baffles as at 39, 41, 43 and 45 may be provided which form the flowing fluid into a high velocity jet. The centrifugal force exerted on the fluid is greater toward the periphery of the housing and will cause the fluid to circulate as indicated. Rotors 32 and 34 are keyed to shafts 40 and 42 respectively. These shafts may constitute the two halves of a rear axle of an automobile or other automotive equipment. Either rotor can rotate faster or slower than the driving housing and thus the differential function of this type of drive is accomplished. Rotors 32 and 34 are provided with an additional series of vanes 44 and 46 respectively. These vanes function as a fluid coupling between these rotors. Normally, when rotating at the same rate, there is no coupling effect between the two rotors. But if one rotor tends to rotate faster than the other as when a driven wheel can exert no tractive effort, that rotor becomes a driver and substantially the entire torque exerted by housing 20 is transferred to the other rotor through fluid coupling 44—46 and the driven wheel, exerting no tractive effort, does not spin rapidly.

In Figures 2 and 3 the radial arrangement of the vanes is shown. Figures 4 and 5 show the vanes by means of which the fluid is forced from the vanes of the driving element and imparts rotation to the rotors.

Figure 6 discloses a modification of the applicant's device in which the rotary housing is positioned in parallel with the driven shafts. In this modification rotary housing 50 is adapted to be connected to the driving shaft at 52 with which it is in axial alignment. Housing 50 is provided with the same arrangement of vanes and fluid couplings as housing 20 of Figure 1. The driven rotors 54 and 56 are also provided with the same arrangement of vanes as rotors 32 and 34 of Figure 1. But in this modification rotor 56 is keyed to shaft 58 which in turn drives shaft 60 through appropriate reducing bevel gears 62 and 64. Rotor 54 is keyed to hollow shaft 66 which is adapted to drive shaft 68 through appropriate reducing bevel gears 70 and 72. Shafts 60 and 68 may constitute the rear axle of an automobile or other automotive equipment. Housing 50 may be placed at any point between the universal joint and the rear axle housing of an automobile.

Figures 7 and 8 disclose another embodiment of applicant's invention which is adapted for heavy drives. Here, as in Figure 1, the rotary housing is in axial alignment with the driven shafts or axles. This housing 80 could be driven by means (not shown) similar to that in Figure 1. This housing is provided with vanes 82 and 84 similar to vanes 27 and 28 of Figure 1, which match up with vanes 86 and 88 in rotors 90 and 92 respectively. These rotors are provided with a fluid coupling 94—96 which corresponds to and functions in the same manner as fluid coupling 44—46 in Figure 1. In this modification this coupling is located near the periphery of the rotors in order to provide space for the trains of planetary reduction gears. These gears are arranged as follows: Rotors 90 and 92 are provided with hubs 98 and 100 respectively on which are positioned spur gears 102 and 104. These gears mesh with star gears 106, 108, 110 and 112 which are carried by spiders 114 and 116. These spiders are firmly attached to driven shafts or axles 118 and 120 respectively. Star gears 106 and 108, 110 and 112 also mesh with fixed ring gears 122 and 124 which are carried on drums 126 and 128 respectively. These drums are provided with hollow shaft hubs 130 and 132 which extend beyond rotary housing 80 and are firmly anchored to the surrounding housing 134. In operation these star gears, in rotating on their axes, revolve around the fixed ring gears in the same direction as the rotation of spur gears 102 and 104. The angular displacement of the axes of the star gears is to the angular rotation of the driving gear as the radius of the driving gear is to the sum of the radii of the driving and star gears. This angular displacement is always less than that of the angular rotation of the driving gear and any desired reduction can be attained by the proper selection of gear ratios. Thus the spiders 114 and 116 and driven shafts 118 and 120 rotate less than the driving gear, and heavier torque loads may be transmitted while maintaining a small compact construction.

While the foregoing description has been drawn to the adaptation of the invention to a differential for automotive equipment, it is not desired to be strictly limited thereto since the embodiments herein shown could be used in the reverse order, i.e., the driven shafts could be the drivers and the rotary housing the driven element. Thus two sources of power could be combined to give a single delivery. Such adaptation is within the spirit and scope of the invention to the extent as defined by the herewith appended claims.

The invention described herein may be manufactured and used by or for the Government of the United States of America for governmental purposes without the payment of any royalties thereon or therefor.

I claim:

1. A fluid differential power transmission device adapted to transmit power from a single source to at least two driven elements comprising a rotary housing adapted to be driven by the source of power, two rotors mounted on separate shafts positioned within the housing, means connecting said shafts to the driven elements, respectively, hydraulic fluid within the housing, fluid coupling means between the rotary housing and each rotor and fluid coupling means between the rotors whereby, when either of the rotors rotates ahead of the other, the source of power transmits substantially all of its power to the lagging rotor.

2. A fluid differential power transmission device adapted to transmit power from a single source to at least two driven elements comprising a rotary housing including two lateral walls adapted to be driven by the source of power, two fluid coupling halves positioned in the lateral walls, respectively, of the housing near the periphery thereof, two rotors mounted on separate shafts positioned within the housing, means connecting said shafts to the driven elements, respectively, fluid coupling halves positioned on said rotors, respectively, adpated to coact with the first mentioned fluid coupling halves, respectively, additional fluid coupling halves positioned on said rotors, respectively, and coacting with each other to exert a coupling effect between the rotors and hydraulic fluid within the rotary housing adapted to flow between said coacting fluid coupling halves, respectively.

3. A fluid differential power transmission device adapted to transmit power from a single source to at least two driven elements positioned at right angles to the transverse axis of the device comprising a rotary housing adapted to be driven by the source of power, two rotors within the housing, one mounted on a tubular shaft adapted to extend beyond the housing, the other mounted on a solid shaft adapted to extend concentrically through the tubular shaft and therebeyond, a pair of bevel reduction gears connecting the tubular shaft to one driven element, another pair of bevel reduction gears connecting the solid shaft to the other driven element, hydraulic fluid within the housing, fluid coupling means between the rotary housing and each rotor and fluid coupling means between the rotors, whereby when either of the driven elements rotates ahead of the other, the source of power transmits substantially all of its power to the lagging driven element.

4. A fluid differential power transmission device adapted to transmit power from a single source to at least two driven elements comprising a rotary housing adapted to be driven by the source of power, two rotors within the housing mounted on separate shafts and provided with axial hubs, two sets of planetary reduction gears, the driving gears of which are mounted on the said axial hubs adapted to drive the said separate shafts, hydraulic fluid within the housing, fluid coupling means between the rotary housing and each rotor and fluid coupling means between the rotors.

5. A power transmission device adapted to combine in additive effect power from at least two sources to give a single delivery thereof comprising two separate shafts in axial alignment adapted to be connected to the sources of power, a rotor mounted on each shaft, a rotary housing surrounding the rotors and provided with hydraulic fluid, said housing being adapted to impart its rotation to a driven element, fluid coupling means between each rotor and the housing adapted to impart rotation thereto as the rotors are rotated and fluid coupling means between the rotors adapted when one of the rotors is idle to apply power to that rotor.

ALFRED A. POWELL.

REFERENCES CITED

The following references are of record in the file of this patent:

UNITED STATES PATENTS

| Number | Name | Date |
| --- | --- | --- |
| 1,985,146 | Campbell | Dec. 18, 1934 |
| 2,063,471 | Stedefeld | Dec. 8, 1936 |
| 2,229,228 | Sutter | Jan. 21, 1941 |
| 2,281,541 | Ash | May 8, 1942 |
| 2,335,544 | Schnetzer | Nov. 30, 1943 |

FOREIGN PATENTS

| Number | Country | Date |
| --- | --- | --- |
| 604,575 | France | May 6, 1926 |